United States Patent [19]

Sawaide et al.

[11] Patent Number: 4,758,295
[45] Date of Patent: Jul. 19, 1988

[54] METHOD OF STOPPING LEAKAGE OF WATER IN CONCRETE STRUCTURE

[75] Inventors: Minoru Sawaide; Hiroshi Miura; Humiharu Machi; Shigeo Shimizu, all of Tokyo, Japan

[73] Assignee: Shimizu Construction Co., Ltd., Tokyo, Japan

[21] Appl. No.: 33,562

[22] Filed: Apr. 3, 1987

[30] Foreign Application Priority Data

Apr. 8, 1986 [JP] Japan .................................. 61-79267

[51] Int. Cl.⁴ .............................................. B32B 35/00
[52] U.S. Cl. ....................................... 156/98; 52/514; 264/36; 427/140
[58] Field of Search .......................... 427/140; 52/514; 264/36; 138/98, 99; 156/94, 98; 166/277

[56] References Cited

U.S. PATENT DOCUMENTS 3,826,680  7/1974  Rio et al. .......................... 427/393.6
3,847,722 11/1974  Kistner .............................. 156/94 X Primary Examiner—Evan K. Lawrence
Attorney, Agent, or Firm—Armstrong, Nikaido, Marmelstein & Kubovcik

[57] ABSTRACT

A method of stopping leakage of water in a concrete structure comprising injecting a hydrophilic one component type polyurethane prepolymer or an impregnating agent which is prepared by adding cement to such polyurethane prepolymer into a hermetically sealed chamber formed in a leaking part of the concrete structure, whereby the polyurethane prepolymer foams and cures through reaction with water leaking in the concrete structure and the foamed prepolymer is forced to enter all cracks in the leaking part of the concrete structure by means of foaming pressure and volume expansion caused by the reaction, thereby caulking and hermetically sealing the cracks, and thus restoring the strength and watertightness of the concrete structure. Also disclosed is a method of stopping leakage of water in a concrete structure using an impregnating agent, comprising boring the central portion of the leaking part; installing an injection pipe for injecting the impregnating agent into the bored portion; fixing the periphery of the injection pipe with a set accelerating agent to thereby define a sealed chamber in the leaking part having the pipe hermetically sealed thereto; injecting the impregnating agent containing a hydrophilic one component type polyurethane prepolymer as its principal component through the injection pipe; sealing the injection pipe so that the injected impregnating agent is prevented from flowing out of the chamber; and carrying out a surface treatment of the concrete structure after confirming that leakage of water has satisfactorily been stopped by the cured impregnating agent.

3 Claims, 3 Drawing Sheets

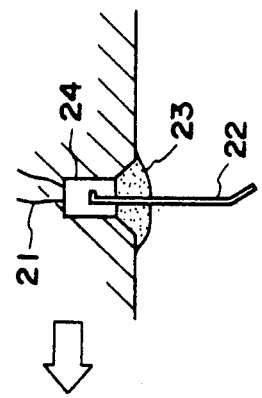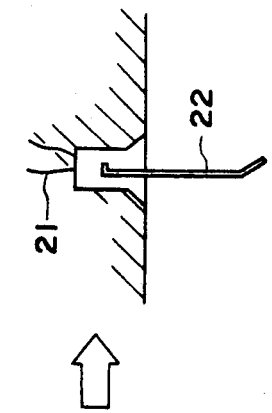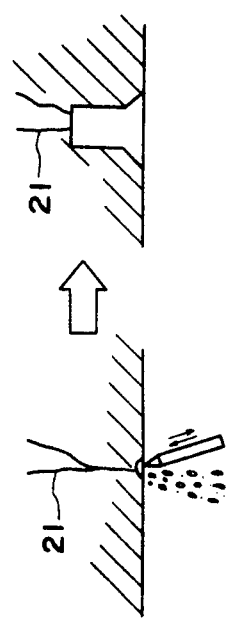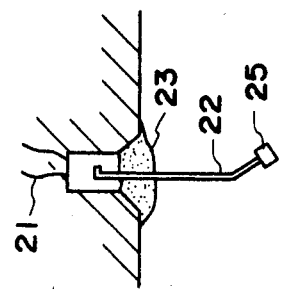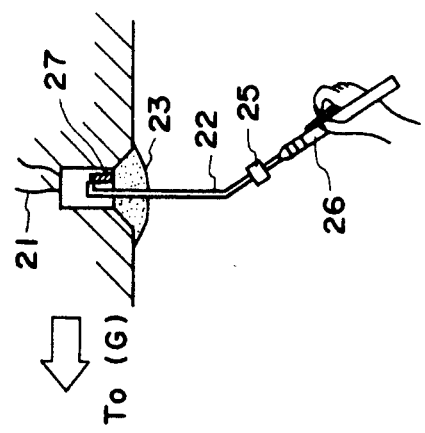
FIG. 2  FIG. 3  FIG. 4  FIG. 5  FIG. 6  FIG. 7

METHOD OF STOPPING LEAKAGE OF WATER IN CONCRETE STRUCTURE

BACKGROUND OF THE INVENTION

The present invention relates to a method of stopping leakage of water in a concrete structure and, more particularly, to a water leakage stopping method wherein all cracks in a leaking part of a concrete structure are caulked and hermetically sealed with a foamed hydrophilic one component type polyurethane prepolymer by means of foaming pressure and volume expansion caused by a reaction taking place between a hydrophilic one component type polyurethane prepolymer and water leaking in the concrete structure.

It is well known that a moisture-curing polyurethane prepolymer reacts with water to cure and it produces carbon dioxide gas in the course of the chemical reaction and thus foams and expands in volume, and it is said that the foaming pressure reaches 50 kg/cm$^2$ or more in a restrained state. It is conventional practice to adopt a water leakage stopping method utilizing the properties of such moisture-curing polyurethane prepolymer, wherein an impregnating agent consisting essentially of the above-described prepolymer is injected under high pressure into a cracked part of a rock bed or into a leaking part of a concrete structure and reacted with water so as to set quickly, thereby filling the crack or gap in the rock bed or the concrete structure with the cured polyurethane foam, and thus stopping leakage of water.

The above-described conventional method, however, simply utilizes the properties of the polyurethane prepolymer that it sets through reaction with water, and intends to stop leakage of water by means of a cured nonwater permeable urethane resin formed on the surface of a leaking part of a concrete structure by applying a large amount of polyurethane prepolymer to the surface of the leaking part. Accordingly, the conventional method does not aim at caulking minute cracks in a concrete structre or restoring the physical strength and watertightness of the concrete structure itself which have been deteriorated by the leakage of water. In other words, the conventional method expects quick stoppage of leakage by the formation of the cured resin; therefore, it is general practice to mix the impregnating agent with a catalyst for accelerating the reaction of polyurethane prepolymer with water or a foaming accelerator for ensuring and accelerating foaming.

For this reason, with the conventional method, a cured urethane resin is rapidly formed on the surface of the concrete structure, while fine cracks which extend to the inside of the concrete structure are left as they are.

More specifically, the above-described conventional method of stopping leakage of water suffers from the following problems:

1. Since the surface of a leaking part of a concrete structure allows application of an infinite amount of impregnating agent, it is uneconomically necessary to consume a large amount of impregnating agent.

2. Application of the impregnating agent to the whole surface of the leaking part of the concrete structure involves difficulties in determining and confirming a necessary amount of impregnating agent.

3. If leaking water flows rapidly, the impregnating agent may be washed away, so that it may be impossible to form a cured resin in order to stop leakage of water.

4. Any excessive foaming caused by the added foaming accelerator results in moisture being lost, and this leads to a reduction in volume of the cured resin, thus failing to obtain leakage stopping effectiveness.

5. Since the cured resin is rapidly formed only on the surface of the concrete structure, cracks which are present inside the leaking part cannot be sealed hermetically but left uncaulked.

6. It is impossible to restore the deteriorated strength and watertightness of the concrete structure itself.

SUMMARY OF THE INVENTION

In view of the above-described disadvantages of the conventional method, it is a primary object of the present invention to provide a leakage stopping method which is economical and reliable and which enables restoration of the deteriorated strength and watertightness of the concrete structure itself and also provide an impregnating agent for use in said method.

The present inventors made an exhaustive study to solve the above-described problems and considered that the deteriorated strength and watertightness of a concrete structure can be restored and leakage of water can be stopped economically and reliably by filling all cracks in a leaking part of the concrete structure with a polyurethane prepolymer utilizing foaming pressure produced in the process of setting of the polyurethane resin caused by its chemical reaction with water present in the concrete structure and thus closing all the cracks extending to the inside of the concrete structure. The present invention has been accomplished on the basis of this consideration.

Thus, the present invention provides a method of stopping leakage of water in a concrete structure comprising injecting a hydrophilic one component type polyurethane prepolymer or an impregnating agent which is prepared by adding cement to such polyurethane prepolymer through an inlet hermetically sealed to a sealed chamber formed in a leaking part of the concrete structure, whereby the polyurethane prepolymer foams and cures through reaction with water leaking in the concrete structure and the foamed prepolymer is forced to enter all cracks in the leaking part of the concrete structure by means of foaming pressure and volume expansion caused by the reaction, thereby caulking and hermetically sealing the cracks, and thus restoring the strength and watertightness of the concrete structure.

According to another aspect of the present invention, there is provided a method of stopping leakage of water in a concrete structure using an impregnating agent, comprising the steps of: applying a ground treatment to the surface of a part of the concrete structure which needs to stop leakage of water; checking the leaking part; boring the central portion of the leaking part; installing an injection pipe for injecting the impregnating agent into the bored portion; fixing the periphery of the injection pipe with a set accelerating agent to thereby define a sealed chamber in the leaking part having the pipe hermetically sealed thereto; attaching a nipple to the injection pipe; injecting the impregnating agent containing a hydrophilic one component type polyurethane prepolymer as its principal component through the injection pipe; sealing the injection pipe so that the injected impregnating agent is prevented from flowing out of the chamber; and carrying out a surface treatment of the concrete structure after confirming that leakage of water has satisfactorily been stopped by the cured impregnating agent.

BRIEF DESCRIPTION OF THE DRAWINGS

FIGS. 2 to 12 are schematic views employed to describe various steps for carrying out the embodiment of the present invention.

DESCRIPTION OF THE PREFERRED EMBODIMENT

Figure 1:
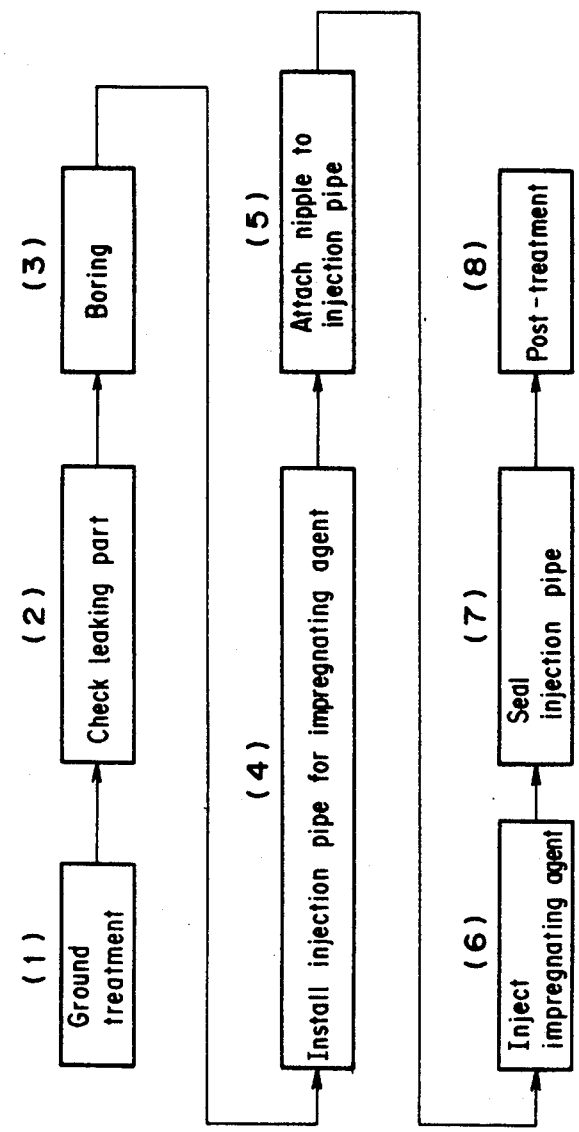
FIG. 1 is a flow chart illustrating one embodiment of the water leakage stopping method according to the present invention.
Figure 8:
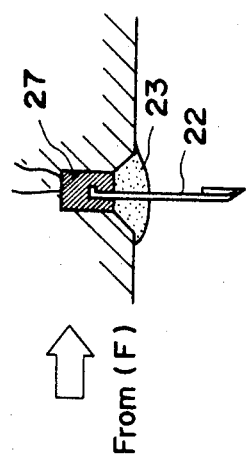
Figure 9:
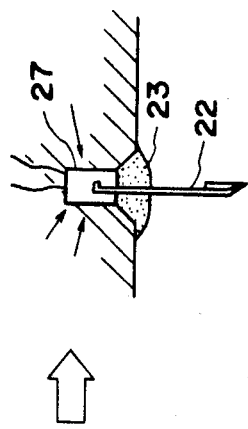
Figure 10:
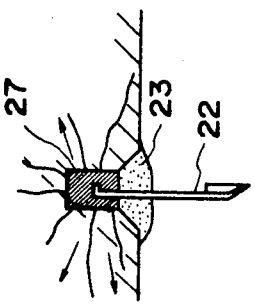
Figure 11:
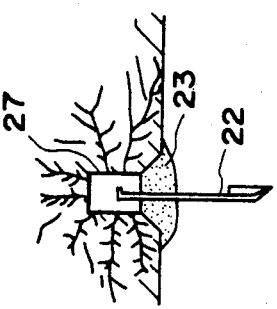
Figure 12:
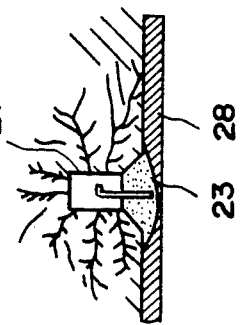

The present invention will be described hereinunder in more detail with reference to FIG. 1 which is a flow chart illustrating one embodiment and FIGS. 2 to 12 which schematically illustrate various steps for carrying out the embodiment.

In the step (1), the surface of a leaking part of a concrete structure which is to be repaired is cleaned to remove extraneous matter, unnecessary matter, any agent applied previously for stopping leakage of water, fur, moss, any alkali product, etc., thereby exposing the skin of the concrete structure.

In the step (2), a leaking cracked part is precisely searched and marked, and the leaking state is checked. This step needs to be carried out in order to minimize the amount of required impregnating agent, which is one object of the present invention. In practice, it is possible to employ any method which is conventionally used in repairing a concrete structure.

In the step (3), a bore is formed in the central portion of a crack 21 in the leaking part within a range where boring has no adverse effect on the strength of the concrete structure in view of the thickness thereof. The boring operation carried out in this step is shown in FIG. 2, and a bore thus formed in the leaking part is shown in FIG. 3.

Then, an injection pipe for injecting an impregnating agent is installed in the step (4), in which a hollow copper or aluminum pipe serving as an injection pipe 22 is inserted into the bore (see FIG. 4), and the periphery of the pipe 22 is fixed by a settable accelerating agent 23 such as quick-setting mortar, thereby forming a sealed chamber 24 in the leaking part having the pipe hermetically sealed thereto (see FIG. 5). In this state, water leaks out through the hollow pipe 22 and therefore applies no pressure to the mortar which fixes the pipe 22. The leaking part is left in this state for seven to ten days until the strength of the fixing mortar has satisfactorily developed.

In the step (5), a nipple 25 for injecting an impregnating agent is attached to the distal end of the injection pipe 22 after the confirmation that the set accelerating agent 23 securing the injection pipe 22 has satisfactorily hardened (see FIG. 6).

Then, in the step (6), the injection port of an injection pump 26 is connected to the nipple 25, and an impregnating agent is injected under pressure (see FIG. 7). The injection pump 26 may be of either the airless type or the plunger type but it must have a gauge so that the injection pressure can be checked. However, in the injection carried out in the present invention the impregnating agent is not forced into cracks in the concrete structure but injected into all minute cracks and capillary cracks therein by means of foaming pressure produced by a chemical reaction taking place between seeping water and the impregnating agent, thereby filling and caulking all the cracks with the cured resin foam. Accordingly, it suffices to inject an an amount of impregnating agent with which the bore and cracks near it are filled up, and it is therefore unnecessary to inject the impregnating agent under high pressure. In general, the injection pressure is maintained at 1 kg/cm$^2$ for about 60 seconds, and if the pressure does not lower thereafter, the injection is suspended, whereas, if the pressure lowers, the injection is carried out again under the same conditions.

In the step (7), when the injection has been completed, the injection pipe of the pump 26 is removed from the nipple 25 attached to the injection pipe 22, and the pipe 22 is completely sealed so that the injected impregnating agent is prevented from flowing out of the chamber 24. For this purpose, the injection pipe 22 may be crushed flat or bent, or it is preferable to employ a nipple 25 having a means for preventing the injected impregnating agent from flowing backward. Immediately after the injection, almost no impregnating agent 27 has yet entered the cracks (see FIG. 8).

In this state, the repaired portion is left as it is for seven to ten days. During this period, the injected impregnating agent chemically reacts with water traveling through small cracks and capillary cracks inside the concrete structure (see FIG. 9) to foam while gradually increasing in volume. In this way, the foamed agent enters the small and capillary cracks in the concrete structure (see FIG. 10) and cures therein, thus caulking and hermetically sealing the cracks. The time required for a cured form or object to be formed by the chemical reaction between the impregnating agent and water depends, of course, upon the kind of impregnating agent employed. In general, however, said time ranges from three to six hours at ordinary temperatures, and the strength of the cured form increases over three weeks thereafter. Accordingly, it is preferable, in the present invention, to provide a curing time of at least ten days. In this point, the present invention most differs from the conventional method of stopping leakage of water by injection. In the conventional injection method, urethane polymer is reacted with water and cured rapidly to complete stoppage of leakage. Accordingly, it is difficult to apply a strong pressure with which the prepolymer is injected into minute cracks in the concrete structure within a short period of time before the prepolymer cures, and it is therefore impossible to completely stop leakage of water due to minute cracks and a new flow path of leaking water which is generated because the old flow path of water is closed. Thus, it has heretofore been impossible, with the conventional method, to cope with leakage of water which oozes out of a concrete structure over a relatively wide area or all over the surface thereof.

In contrast, according to the present invention, any water which leaks out by capillary action slowly reacts with the injected impregnating agent to cause the latter to expand in volume, so that all minute cracks and capillary cracks are filled with the impregnating agent which then cures, thus enabling leakage of water to be completely stopped. Since the injection inlet is completely closed, the injected impregnating agent is confined in the concrete structure and cannot flow out anywhere. The impregnating agent is forced by the foaming pressure to advance in the direction in which seeping water flows out and therefore the injected resin may be pushed out to the surface through small cracks in the concrete structure, but in such a case, the leakage of resin is left as it is. Leakage of water will not stop until the time required for the impregnating agent to cure has elapsed, but will gradually stop as the injected agent cures (see FIG. 11).

It should be noted that, if there is leakage of water even when several days to ten or more days has elapsed after the completion of the above-described operations, said operations are conducted again for the same leaking part.

Finally, in the step (8), a post-treatment is carried out. More specifically, after the confirmation that the leakage of water has satisfactorily been stopped, the injection pipe 22 is cut and a surface treatment 28 is applied, thus completing the whole operation (see FIG. 12).

The impregnating agent according to the present invention contains as its principal component a hydrophilic one component type polyurethane prepolymer which reacts with water to foam and cure. Such hydrophilic one component type polyurethane prepolymer is a product obtained by reacting an organic compound having isocyanate groups with polyalkyleneglycol, polyalkyleneglycol alkyl ether, polyalkyleneglycol aryl ether, polyalkyleneglycol alkylaryl ether, or a mixture of polyalkyleneglycol and an organic carboxylic ether of polyalkyleneglycol.

Here, polyalkyleneglycol, polyalkyleneglycol alkyl ether, polyalkyleneglycol aryl ether and polyalkyleneglycol alkylaryl ether are polymers of ethylene oxide or propylene oxide or copolymers of these oxides and have a molecular weight of from 100 to 10,000. The above-described organic carboxylic ether of polyalkyleneglycol is a polycarboxylic ester of polyalkyleneglycol, and practical examples of polycarboxylic acids include maleic acid, adipic acid and phthalic acid.

The above-described organic compound having isocyanate groups, which is reacted with polyalkyleneglycol, polyalkyleneglycol alkyl ether, polyalkyleneglycol aryl ether, polyalkyleneglycol alkylaryl ether, or a mixture of polyalkyleneglycol and an organic carboxylic ether of polyalkyleneglycol, is a compound having at least two isocyanate groups. Practical examples of such compound include tolylene diisocyanate, methylene diphenyl diisocyanate (polymethylene polyphenylene isocyanate), xylylene diisocyanate and hexamethylene diisocyanate. Among these compounds, tolylene diisocyanate and methylene diphenyl diisocyanate are preferable in view of control of the setting time. Polyalkyleneglycol, polyalkyleneglycol alkyl ether, polyalkyleneglycol aryl ether, polyalkyleneglycol alkylaryl ether or a mixture of polyalkyleneglycol and an organic carboxylic ether of polyalkyleneglycol and an organic compound having isocyanate groups are preferably reacted with each other in the proportion of one hydroxyl group of the former to from one to ten isocyanate groups. If they are reacted with each other in the proportion of one hydroxyl group of the former to less than one isocyanate group, the polymerization grade lowers to deteriorate the setting characteristics, unfavorably. If the proportion is one hydroxyl group of the former to ten or more isocyanate groups, the polymerization velocity is excessively high, which is unfavorable for reasons such as that it is difficult to control the setting speed. The reaction is generally carried out by a known method.

The degree of foaming reaction performed by a hydrophilic one component type polyurethane prepolymer employed in the present invention can be adjusted by mixing the prepolymer with cement as an impregnating agent. The upper limit of the amount of cement which may be mixed with the prepolymer for attaining the object of the present invention while suppressing foaming is preferably set at about 2.2 times the polyurethane prepolymer by weight. Cement and polyurethane prepolymer are in complementary relation to each other and the combination of these two materials is therefore recognized to be effective in carrying out the present invention. Both cement and polyurethane prepolymer react with water to set, and it is therefore clear that water is a mutual reaction agent. Since a gas which is generated from polyurethane prepolymer when water is added thereto is absorbed by cement, if cement and polyurethane prepolymer are mixed together in advance and water is added to the mixture to start their curing reactions simultaneously, a cured form having their respective characteristics is obtained. Thus, cement and polyurethane prepolymer affect each other so as to improve their physical properties and provide an advantageous combination of materials which enables an improvement in the quality of the cured form.

It is apparently possible to use, as an impregnating agent of the present invention, a variety of materials which are conventionally employed as impregnating agents, such as water glass and other alkaline substances, unless the material employed hinders accomplishment of the object of the present invention.

For reference, reaction formulae respectively representing foaming and curing reactions of urethane prepolymer with water are shown below:

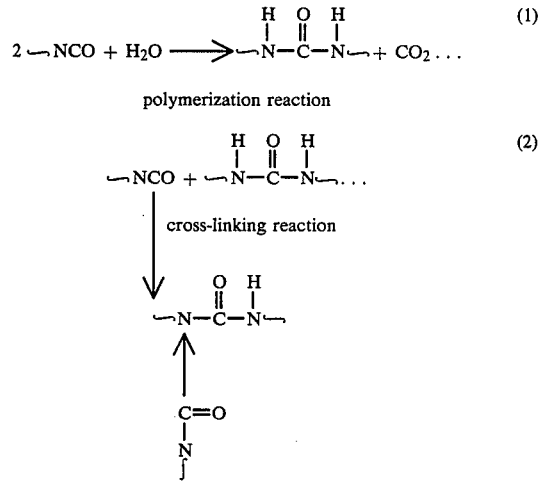

As will be clear from the above description, the present invention provides an excellent leakage stopping method having the following advantageous effects, together with an impregnating agent for use in said method.

1. The method of the present invention aims at caulking and hermetically sealing all cracks in a concrete structure with an impregnating agent. For this purpose, a hydrophilic one component type polyurethane prepolymer is used in such a manner that it is reacted with seeping water so as to foam and increase in volume slowly in proportion to the amount of seeping water, thereby closing all the cracks without using any foaming agent or curing accelerator. Thus, cracks are caulked and hermetically sealed in the process wherein polyurethane prepolymer chemically reacts with water to foam and expand in volume and, while doing so, it cures gradually, which means that all the cracks in the leaking part are completely caulked and hermetically sealed, advantageously.

2. Since the impregnating agent is injected in an amount which is slightly greater than that which is required to fill a hermetically sealed chamber defined by a bore formed in a concrete structure, it is possible to precisely determine an amount of impregnating agent to be injected and there is, economically, no fear of the impregnating agent being injected in an amount which is greater than is necessary.

3. Since the impregnating agent alone is injected and the injection port is sealed, the injected agent reacts with only water which passes through cracks in the concrete structure, and thereby cures. Accordingly, the injected impregnating agent automatically enters any portion where water seeps, so that all the cracks are caulked and hermetically sealed with the impregnating agent.

4. The impregnating agent is injected into a hermetically sealed chamber defined by a bore formed in a concrete structure or a rock bed. Accordingly, there is no fear of the injected agent being washed away by leaking water, and it is possible to effectively and reliably stop the leakage of water.

What we claim is:

1. A method of stopping leakage of water in a concrete structure, comprising forming a sealed chamber in a leaking part of the concrete structure, said chamber having inlet means hermetically sealed thereto, injecting an impregnating agent containing a hydrophilic one component type polyurethane prepolymer as its principal component through the inlet means into the sealed chamber, whereby said polyurethane prepolymer foams and cures through reaction with water leaking in said concrete structure and the foamed prepolymer is forced to enter all cracks in said leaking part by means of foaming pressure and volume expansion caused by said reaction, thereby caulking and hermetically sealing said cracks, and thus restoring the strength and watertightness of said concrete structure.

2. A method according to claim 1, wherein said impregnating agent contains cement.

3. A method of stopping leakage of water from a leaking part in a concrete structure using an impregnating agent, comprising the steps of:

cleaning the surface of the leaking part;

forming a bored portion in the central portion of the leaking part;

installing an injection pipe for injecting said impregnating agent into the bored portion;

fixing the periphery of the injection pipe in the bored portion with a fast setting agent to thereby define a sealed chamber in the leaking part having said pipe hermetically sealed thereto;

injecting said impregnating agent containing a hydrophilic one component type polyurethane prepolymer, which foams and cures through reaction with water, as its principal component through the injection pipe into the chamber;

sealing the injection pipe to prevent the injected impregnating agent from flowing out of the chamber;

allowing said impregnating agent to foam and cure by reaction with the leaking water in order to stop said leakage; and cutting the injection pipe at the surface of the concrete structure after the impregnating agent has cured.

* * * * *